United States Patent [19]

Wang

[11] Patent Number: 5,389,352
[45] Date of Patent: Feb. 14, 1995

[54] OXIDE PARTICLES AND METHOD FOR PRODUCING THEM

[75] Inventor: Jiun-Fang Wang, Piscataway, N.J.

[73] Assignee: Rodel, Inc., Newark, Del.

[21] Appl. No.: 95,749

[22] Filed: Jul. 21, 1993

[51] Int. Cl.⁶ ............................................. C01F 17/00
[52] U.S. Cl. ...................................... 423/263; 106/3; 501/152
[58] Field of Search ...................... 106/3; 51/307, 309; 423/263; 501/152

[56] References Cited

U.S. PATENT DOCUMENTS

| | | | |
|---|---|---|---|
| 3,311,461 | 3/1967 | Silvernail | 51/293 |
| 3,768,989 | 10/1973 | Goetzinger et al. | 51/309 |
| 4,529,410 | 7/1985 | Khaladji et al. | 51/309 |
| 4,619,817 | 10/1986 | Stambaugh et al. | 423/266 |
| 4,859,432 | 8/1989 | David et al. | 423/263 |
| 5,021,192 | 6/1991 | David et al. | 423/263 |
| 5,026,421 | 6/1991 | Le Loarer et al. | 423/263 |

OTHER PUBLICATIONS

Hsu et al., Preparation and Properties of Monodispersed Colloidal Particles of Lanthanide Compounds—2. Cerium(IV)+, Langmuir, vol. 4, pp. 31–37, 1988 [no month].

Grahl-Madsen and Riman, Hydrothermal Preparation of Stabilized Zirconia Powder Proc. 3rd Int. Conf. on Ceramic Powder Science pp. 33–40, 1990 [no month].

*Primary Examiner*—Anthony Green
*Assistant Examiner*—C. M. Bonner
*Attorney, Agent, or Firm*—Kenneth A. Benson

[57] ABSTRACT

The invention is a process for preparing chemically active solid oxide particles useful for polishing, composed primarily of $CeO_2$, or $CeO_2$ together with other oxides, comprising: (a) forming an aqueous solution comprised of a water soluble trivalent cerium salt and an oxidizing agent and (b) aging said mixture in the liquid state for a time not less than 4 hours.

8 Claims, No Drawings

OXIDE PARTICLES AND METHOD FOR PRODUCING THEM

BACKGROUND OF THE INVENTION

1. Field of the Invention

The invention is a process for preparing chemically active solid oxide particles useful for polishing, composed primarily of $CeO_2$, or $CeO_2$ together with other oxides, which consists of mixing an aqueous solution of a water soluble trivalent cerium salt together with an oxidizing agent and aging said mixture in the liquid state for a time not less than 4 hours.

2. Description of the Prior Art

The invention is useful for the polishing of glass and other silica or silicon containing articles. The polishing process consists of the controlled abrasion of a solid surface by a suspension of small solid abrasive particles which is pressed against the substrate surface by a rotating viscoelastic pad. While, in principle, slurries of any particles may be used to polish a surface, in practice, only specific classes of particles have been shown to exhibit polishing rates which are high enough to be economically useful. Chemically active polishing compounds are restricted to a small class of oxides, particularly, $CeO_2$, $ZrO_2$, $Fe_2O_3$ and $SnO_2$. Of these oxides, $CeO_2$ has by far the highest polishing activity, and is the preferred basis of the vast majority of commercially available polishing slurries.

The above oxides have been shown to require specific activation sequences before high rates of polishing are observed. Specifically, all known prior art polishing compounds require calcination, i.e. a roasting of previously prepared solid particles at some temperature below the sintering point of the oxide, to produce the desired activity. While it is recognized that a partial reason for the calcination is the conversion of solid starting compounds (e.g. carbonates, oxalates, nitrates or sulphates) to the corresponding oxide, specific sintering temperatures not directly related to the conversion have been demonstrated to have a pronounced effect on rate.

While calcination is universally practiced in the manufacture of polishing compounds, it is disadvantageous for several reasons. First, gaseous byproducts are produced which in some cases can be toxic or corrosive ($CO$, $NO_x$, $HF$, $SO_3$). Second, calcination is energy intensive and relatively expensive. Third, exposure to furnace environments leads to the contamination of the polishing compound by furnace refractories or environmental debris which may degrade polishing performance due to scratch formation by the foreign material.

The most significant difficulty caused by the calcination process is that products must be milled after calcination to yield particle size distributions in the final product which are sufficiently small to prevent scratching. Particles above a critical diameter produce a scratched rather than a polished surface. While this is less critical for coarse polishing processes, production of critical optical surfaces, semiconductor wafers and integrated circuits requires a complete freedom from surface defects, achievable only when particle size distributions fall below 1 micron. Production of such distributions by conventional milling techniques is extremely difficult and often not economically feasible.

To date, the only technique which has been shown to produce solid oxides directly from solution is hydrothermal synthesis. In this process, amorphous metal hydrous oxides are held at elevated temperature and pressure for varying times to produce small particles of the solid oxide in the final solution. While the process has been extensively investigated for use in structural ceramics as in U.S. Pat. No. 4,619,817, there has been no indication of its utility in preparing polishing compounds. To date, only two publications have disclosed methods for preparing $CeO_2$ particles via hydrothermal synthesis. They are:

Hsu et al, (Langmuir vol. 4, pp.31–7, 1988), aged extremely dilute ($10^{-4}$ molar) solutions of ceric sulphate at low pH (0.5-2.0) at 90° C. to yield submicron particles of cubic $CeO_2$ which were contaminated with varying amounts of sulphate. No effort was made to evaluate polishing activity. The extremely low starting concentrations make such a synthesis economically infeasible.

Grahl-Madsen and Riman (Proc. 3rd Int. Conf. on Ceramic Powder Science, pp. 33–40, 1990) described the incorporation of cerium into zirconium oxide powders prepared via hydrothermal synthesis. Trivalent Cerium salts, $Ce(NO_3)_3$, were added to a basic (pH 9.5) solution of 1 molar $Zr(NO_3)_2 \cdot XH_2O$ to form a gel which was then exposed to hydrothermal conditions (closed cell at 250° C.) for varying times so as to transform the gel into a crystalline oxide product. Pure cerium oxides were prepared using extremely dilute (0.016M) starting solutions of $Ce(NO_3)_3$. Cubic non-stoichiometric $CeO_2$ products were produced which had a primary crystallite size of 40 nm. The reaction mechanism proposed was the hydrothermal transformation of an amorphous hydrous oxide gel precursor into a solid crystalline oxide product. No polishing data were disclosed.

From the above, it is clear that a technique which produces solid oxide polishing compounds of appropriate size and polishing activity directly from solution at high solution concentration would be highly desirable, as almost all of the manufacturing steps currently required for production could be eliminated.

DESCRIPTION OF THE INVENTION

The process of the present invention is comprised of preparing a solution composed primarily of a water soluble salt of trivalent cerium (e.g. $Ce(NO_3)_3$) in water together with an oxidizing agent and aging the solution for a period of time sufficient to convert the starting materials to submicron particles of the solid oxide. Unexpectedly, water itself has been shown to be a sufficient oxidizing agent, following the reaction:

$$Ce^{3+} + 2H_2O \rightleftharpoons CeO_2 + 3H^+ + \tfrac{1}{2}H_2$$

However, other oxidizing agents, particularly hydrogen peroxide may be added yielding a reaction mechanism of:

$$Ce^{3+} + H_2O_2 \rightleftharpoons CeO_2 + 3H^+ + \tfrac{1}{2}H_2 + \tfrac{1}{2}O_2$$

The formation of both hydrogen and protons as reaction products on aging is a characteristic of syntheses of the present invention. One my optionally add bases, buffers or substances reactive to free hydrogen to further modify the course of the reaction. One can improve yields of $CeO_2$ by neutralizing resulting protons, thus driving the reactions to the right, modify the $Ce^{3+}/Ce^{4+}$ ratio in the resulting product by altering the redox equilibria during the reaction, eliminate the possibility of flame or explosion due to the formation of free hydrogen reaction products by reacting or burning off the hydrogen or provide solutions of varying pH following the completion of the conversion to the oxide, again by controlling the proton concentration in the reaction products.

An additional feature of the present invention is that, optionally, the products of the present invention can be re-treated using fresh trivalent salt solutions so as to produce crystals of appreciably larger size than can be produced in a single step synthesis. This permits a wide variety of particle sizes to be produced for various applications, e.g., grinding abrasives.

Another feature of the invention is that, optionally, one may add non-cerium compounds to the aqueous solution so that particles of other oxides might be formed along with the $CeO_2$ particles.

While apparently similar, this invention differs substantially from the mechanism set forth by Grahl-Madsen and Riman. They propose a mechanism whereby an initial amorphous $Ce^{4+}$ hydrous oxide gel is converted to the crystalline oxide by exposure to elevated temperatures and pressures, at or above 250° C. In contrast, we have shown that the reaction mechanism is substantially more complex, consisting of a significant redox reaction which results in the production of hydrogen gas as the crystalline oxide is produced. A recognition of the redox nature of the reaction allows many additional refinements as outlined above. The ability to control crystal stoichiometry is believed to be particularly significant, as the introduction of a controlled non-stiochiometry during synthesis will result in the formation of a controlled level of lattice defects in the resulting crystals, an effect which is believed to have a positive effect on the polishing activity. Thus control of non-stiochiometry should allow control of the uniformity of polishing rates in resulting products. High yields of crystalline $CeO_2$ can be produced at room temperature or temperatures well below the boiling point of water, making practical synthesis of solid oxides appreciably easier and less expensive.

EXAMPLES

All drying of solutions in the following Examples was carried out at ambient temperature and pressure.

Example 1

Solutions with 0.06 mol and 0.12 mol of $Ce(NO_3)_3$ were prepared using reagent grade $Ce(NO_3)_3$, deionized water and 28% $NH_4OH$. The pH was adjusted to about 9.5 with the 28% $NH_4OH$. After reaction at 210°–250° C. for 24 hours in a closed container, the average crystallite size was measured via transmission electron microscopy as about 30 nm for the 0.06 mol solution and about 50 nm for the 0.12 mol solution. Both solutions produced off-white slurries which gave pale tan powders after drying. A polishing test was carried out using a combination of the two slurries at 1% by weight solids. The test showed about 1000 Angstroms/min removal rate on $SiO_2$.

Example 2

70 ml of solution with 0.06 mol of $Ce(NO_3)_3$ were prepared using 15 ml of 28% $NH_4OH$ and deionized water. After reaction at 150° C. for 24 hours in a closed container, an off-white slurry was produced which gave a pale tan powder after drying. The average crystallite size was about 40 nm.

Example 3

A solution was prepared as in Example 2 which was held at a reaction temperature of 75° C., rather than at 150° C. as in Example 2. As determined by X-ray diffraction patterns, two different kinds of crystalline phases were formed. The majority was cubic ceria phase and a minor unidentified phase was also formed. The unknown phase disappeared after further reaction at 200° C. for 24 hours. An off-white slurry was formed which became a pale tan powder after drying. The average particle size was about 100 nm both before and after further reaction. Yield of product in mols versus mols of starting material was greater than 90%.

Example 4

A solution was prepared as in Example 2 in which the Ce(III) solution concentration was doubled to 0.12 mol. This solution was reacted at a temperature of 105° C. for 24 hours. Only cubic phase ceria was detected in the product off-white slurry or the pale tan powder formed on drying. Again, the product yield in mols versus mol of starting material was greater than 90%.

Example 5

When $H_2O_2$ was used as an oxidizing agent in the cerous salt solutions, crystallites of $CeO_2$ were formed at room temperature. When 3 ml of 30% $H_2O_2$ was diluted with 30 ml of deionized water and mixed with 0.06 mol $Ce(NO_3)_3$ followed by pH adjustment with 20 ml of 28% $NH_4OH$ to form a 70 ml solution, the mixture generated heat and bubbles and a dark brown solution. After four hours of aging, powder formed from the solution on drying showed an average crystallite size of about 7 nm.

Example 6

When a solution similar to that of Example 5 was reacted at 150° C. for 24 hours in a closed container, the resulting powder was creamy-yellow in cubic crystalline phase and had an average crystallite size of about 12 nm. The yield of product in mols versus mols of starting material was greater than 95%.

Example 7

A ceria slurry obtained from 0.06 mol cerous solution reacted at 150° C. for 24 hours was used as seed particles for further reaction. The crystallite size of the seeds ranged from 10 to 30 nm. The slurry of seed particles was neutralized using 28% $NH_4OH$ and washed until the solution pH was about 7. The slurry of seed particles was then mixed with a cerous solution prepared using 30 ml of deionized water, 0.06 mol of cerous salt and 15 ml of 28% $NH_4OH$ and then held at a reaction temperature of 110° C. for 24 hours. The resulting slurry was off-white and yielded a pale tan powder on drying. The particles obtained were of cubic crystalline phase and showed an average particles size of greater than 100 nm.

I claim:

1. A process for preparing chemically active solid $CeO_2$ particles useful for polishing comprising: (a) forming an aqueous solution comprised of a water soluble trivalent cerium salt and an oxidizing agent and (b) aging said solution as a liquid phase for a time not less than 4 hours at which time said trivalent cerium salt has been oxidized to said chemically active solid $CeO_2$ particles.

2. A process as set forth in claim 1 wherein said oxidizing agent consists of water and said aging is carried out at a temperature of 100° C. or greater.

3. A process as set forth in claim 1 wherein said oxidizing agent consists of hydrogen peroxide.

4. A process as set forth in claim 1 wherein bases or buffers are added to said solution before aging.

5. A process as set forth in claim 1 wherein said water soluble trivalent cerium salt is $Ce(NO_3)_3$.

6. A process as set forth in claim 1, 2, 3, 4 or 5 wherein a salt or salts other than cerium compounds are added to said solution before aging so that particles prepared are a mixture of oxides.

7. The submicron particles produced from the process as set forth in claim 1, 2, 3, 4 or 5.

8. The submicron particles produced from the process as set forth in claim 1, 2, 3, 4 or 5 wherein a salt or salts other than cerium compounds are added to said solution before aging so that particles prepared are a mixture of oxides.

* * * * *